United States Patent Office 2,885,015
Patented May 5, 1959

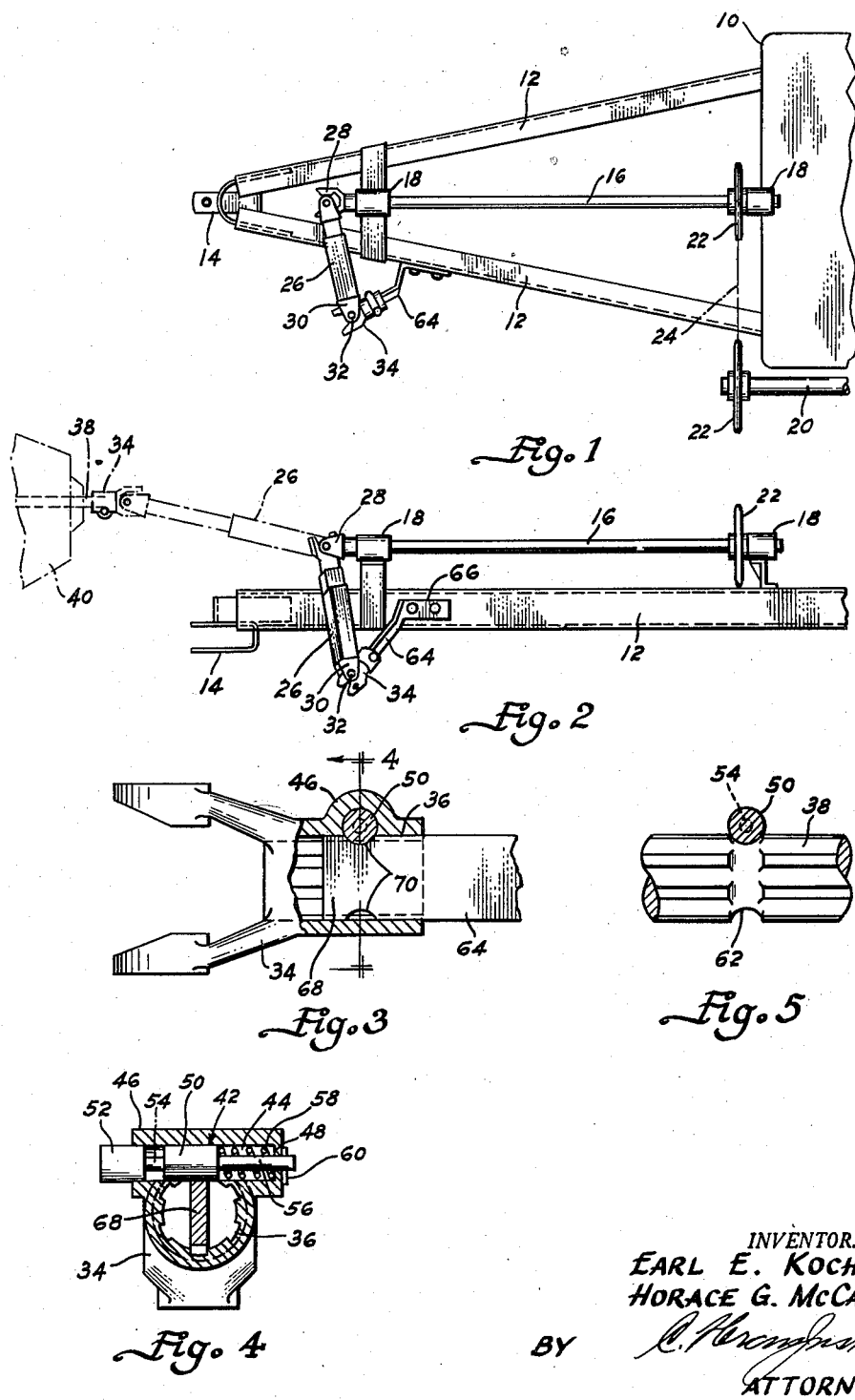

2,885,015

YOKE RETAINER FOR SEPARABLE DRIVE SHAFTS BETWEEN VEHICLES

Earl E. Koch, Mohnton, and Horace G. McCarty, New Holland, Pa., assignors to Sperry Rand Corporation, New Holland, Pa., a corporation of Delaware Application January 24, 1957, Serial No. 636,154

6 Claims. (Cl. 180—14)

This invention relates to improvements in a yoke retainer and, more particularly, to a retainer for a yoke of a universal joint connected to the outer end of a driven shaft on an agricultural implement.

It is common practice in many types of implements and particularly agricultural implements, of which a manure spreader is one specific example, to provide a driven shaft thereon for purposes of operating a portion of the implement. For example, in a manure spreader, a conveyor belt comprising the bottom of the body of the implement is progressively moved from the front to the rearward end of the implement, there usually also being a rotatable spreader member at the rear end of the implement for distributing the manure. Whereas such moving parts of this type of instrument used to be moved by the supporting wheels of the implement, modern implements of this type now include a driven shaft which is connectable to a power shaft of a prime mover such as an agricultural tractor having a power take-off shaft usually at the rear end thereof.

In order to provide flexibility in coupling an agricultural implement to this type of prime mover, at least one universal joint is provided, particularly at the forward end of such driven shaft and the forward yoke of such universal joint has a socket which is slipped onto the projecting power take-off shaft of the prime mover. Suitable latching means, and keying means, such as splines, are provided in such connection.

In even more modern types of implements of this nature, an auxiliary or supplementary driven shaft which preferably is adjustably slidable is connected to the forward end of the principal driven shaft by a universal joint, for example, and still another universal joint is connected to the forward end of the supplementary shaft for attachment to the power take-off shaft of the prime mover such as a tractor, this auxiliary shaft lessening the angles between the yokes of the individual universal joints, thereby increasing the life and efficiency thereof.

Implements of this nature also usually are provided with draft means such as a tongue which is connected at its forward end to the prime mover for purposes of pulling the implement in trailing manner behind the prime mover. In instances where the implement has only a pair of supporting wheels, such draft means usually is of a rigid nature and projects forwardly from the body or frame of the implement.

Under a number of conditions of use, it is desirable that the draft means only be connected to a prime mover, such as when the implement is being pulled to a field or when the implement otherwise might be connected to the rear end, for example, of another implement and it is not necessary or desirable for the driven shaft of the trailing implement to be connected to the power take-off shaft of the prime mover. Under such conditions, the driven shaft on the last mentioned implement has flexible means at the forward end thereof, including either a single universal joint or an auxiliary drive shaft and additional universal joint which tend to dangle when not connected to a power take-off shaft. Under certain conditions, such dangling forward end of the drive means may become damaged, form an obstruction or nuisance, and also possibly contact the dirt or mud of a field or roadway. To overcome this difficulty, such forward end sometimes is tied by twine or wired crudely to the implement.

The principal object of the present invention is to provide a suitable retainer upon the implement for purposes of holding or securing the dangling, flexible forward end of the drive shaft means of an agricultural implement so as to prevent damage to the same and also keep such forward end from being a nuisance when not connected to the power take-off shaft of a prime mover for example.

Still another object of the invention is to so arrange the retaining means that the normal latch means for the forward universal joint yoke of said power shaft means may be used to detachably secure or lock said end to the retainer.

A still further object of the invention is to provide a retainer, for the purpose specified above, of such simple and durable means that substantially no additional cost will be added to an implement of the type described in providing the same with said retaining means.

Details of the foregoing objects and of the invention, as well as other objects thereof, are set forth in the following specification and illustrated in the accompanying drawing comprising a part thereof.

In the drawing:

Fig. 1 is a top plan view of the forward end portion of an agricultural implement to which the present invention has been applied, said view illustrating the forward flexible end of the drive shaft means secured to a retainer embodying the principles of the present invention.

Fig. 2 is a side elevation of the structure shown in Fig. 1 and further illustrating, in phantom lines, the connection of the forward flexible end of the drive shaft means of an implement to a power take-off shaft of a prime mover, the latter being only fragmentarily illustrated.

Fig. 3 is a fragmentary side elevation of the forward yoke of the foremost universal joint on the drive shaft means illustrated in Figs. 1 and 2, but shown on a larger scale, this figure illustrating said forward yoke connected to the fragmentarily illustrated outer end of the retainer means in accordance with the invention.

Fig. 4 is a vertical sectional view of the structure shown in Fig. 3, along the line 4—4 of said figure.

Fig. 5 is a fragmentary side elevation of the rearward end of the power take-off shaft shown in Fig. 2 but illustrated on a larger scale than in said latter figure, for purposes of showing the manner in which latch means secure the forward yoke of the drive shaft means to said power shaft.

For purposes of illustrating the principles of the present invention, an agricultural manure spreader has been selected as an exemplary type of vehicle to which the present invention may be applied.

It is to be understood however that the application of the invention is not to be restricted to this specific illustration since the same may be adapted to many other types of agricultural implements which employ a driven shaft which is connectable to the power take-off shaft of a prime mover such as an agricultural tractor.

Further, the specifically illustrated manure spreader which has been selected as a representative implement is of the two wheel type and has a rigid draft means described in detail hereinafter. A manure spreader of this type may serve a number of purposes, some of which do not require the drive shaft thereon to be operated. For example, in forage operations, said spreader may be attached to the draw bar extension of a forage harvester, whereby the manure spreader then serves primarily as a wagon. However, when the spreader is to be used for the purpose of spreading manure, then the driven shaft thereon is connected to the power take-off shaft of a prime mover.

Referring particularly to Figs. 1 and 2, the exemplary manure spreader comprises a body 10 which is supported by a pair of wheels, not illustrated. Draft means 12, which may comprise a pair of facing channel members connected at the forward ends thereof, are provided with a clevis 14 by which the draft means is connected to the rear end of a prime mover or other implement used to pull the spreader.

An exemplary main driven shaft 16 is rotatably supported at opposite ends by a pair of bearings 18 fixed relative to the body and draft means. An additional driven shaft 20 also may be provided at one side of the body 10 for example, or at any other necessary location, the shafts 16 and 20 being connected by any suitable means such as sprocket gears 22, and a diagrammatically illustrated sprocket chain 24, or otherwise.

The forward end of the driven shaft 16 is connected to an auxiliary driven shaft unit 26 which may comprise a pair of telescopically, slidably connected members in accordance with conventional practice, one of these members being connected by a first universal joint 28 to the forward end of main driven shaft 16. The other telescopically connected member of auxiliary driven shaft unit 26 is connected at its normally forward end to one yoke 30 of a second universal joint 32. The principal purpose of providing an auxiliary driven shaft unit 26 is to lend greater flexibility and efficiency of operation to the drive shaft means of the implement, especially when executing turns. This is also the reason for making said unit so as to be longitudinally extendable and contractable in accordance with conventional practice.

The second universal joint 32 also comprises a normally forward yoke 34 having a splined socket 36 which receives the projecting, normally rearward end of a power take-off shaft 38 of a prime mover such as an agricultural tractor 40 which is fragmentarily illustrated in Fig. 2. An enlarged fragmentary view of power take-off shaft 38 is also illustrated in Fig. 5.

For purposes of detachably securing the forward yoke 34 of the second universal joint to power take-off shaft 38, said yoke 34 is provided with exemplary latching means 42, best shown in Fig. 4, this specifically illustrated means comprising a rod-like member slidably mounted in a recess 44 in a boss-like body 46 which is preferably integral with the forward yoke 34. The axis of the recess 44 extends transversely to the axis of splined socket 36, said recess 44 terminating at one end in an annular shoulder 48.

The rod-like member 42 is provided with a pair of portions 50 and 52 which are complementary in shape to the recess 44 and are guided during movement by the walls of said recess. Said portions 50 and 52 are connected by an intermediate portion 54 which is of substantially smaller diameter than the portions 50 and 52. The portion 52 also projects beyond one end of the boss-like body 46 and comprises an operating button for the rod-like latching means 42. The other end of rod-like member 42 has a portion 56 which is of smaller diameter than the portions 50 and 52 and is surrounded by a compression spring 58 which extends between the adjacent end of portion 50 and the annular shoulder 48. A suitable locking means such as a cotter pin or split washer 60 engages the outer end of portion 56 of member 42 to limit movement thereof toward the left as viewed in Fig. 4.

The arrangement in construction of the latching means 42 is such that the spring 58 normally will retain portion 50 of said means within an annular groove 62, see Fig. 5, in the splines of power take-off shaft 38 and thereby lock the forward yoke 34 detachably to shaft 38 when the driven shaft means of the implement is connected to the prime mover 40. When however the portion 52 of latching means 42, comprising a push button, is pressed inwardly of boss-like body 46, the intermediate portion 54 of said latching means is disposed adjacent annular groove 62 of power take-off shaft 37 and will permit the yoke 34 to be moved longitudinally from power take-off shaft 38.

Such latching means described above for purposes of securing yoke 34 to power take-off shaft 38 also conveniently are utilized, as described hereinafter, for purposes of securing said yoke to retaining means embodying the principles of the present invention.

It is obvious from Fig. 2 particularly, when the flexible forward end portion of the driven shaft means, comprising auxiliary driven shaft unit 26 and the universal joints connected thereto, is disconnected from power take-off shaft 38, no means normally is provided on conventional implements to hold said forward flexible end of the driven shaft means from dangling. Various expedients of a crude nature have been resorted to as using twine or wire to fasten said dangling, flexible forward ends to the draft means of the implement for example. Said expedients have not been satisfactory however and one of the principal purposes of the present invention is to provide a desirable retainer comprising a bracket member 64 which conveniently may be secured to a portion of the implement such as draft means 12. The bracket member 64 has an ear 66 which is connected by suitable bolts, for example, to the outer face of one of the channel members comprising draft means 12. The bracket member 64 preferably extends downwardly and forwardly as seen in Figs. 1 and 2, relative to draft means 12. The outer end 68 of bracket member 64 may be any desired complementary shape relative to the splined socket 36 of yoke 34.

In the specific embodiment illustrated herein, said outer end 68 of the bracket member is blade-like and, at its opposite edges, is complementary in shape to the spaces between pairs of opposed splines of said socket 36, as clearly shown in Fig. 4. Further, said forward end is provided with a pair of curved notches 70 which are complementary in shape to the portion 50 of latching means 42, as best shown in Fig. 3. Two of the notches 70 preferably are formed, respectively in opposite edges of the outer end 68 of the bracket member, whereby the yoke 34 may be detachably latched or secured to said forward end of bracket member 64, regardless of which edge of the forward end 68 is disposed adjacent the portion 50 of the latching means.

Hence, it will be seen that the latching means normally used to secure the forward yoke 34 of the drive shaft means to the power take-off shaft 38 likewise is utilized to detachably secure said forward yoke to the bracket member 64 when said yoke and the other elements of the flexible forward portion of the driven shaft means is disconnected from the power take-off shaft and otherwise is idle. The yoke 34 readily may be disconnected from the bracket member 64 when it is desired to connect said yoke to the power take-off shaft 38, simply by depressing button 52 of latching means 42 until the intermediate portion 54 of the latching means is disposed adjacent the forward end 68 of bracket member 64, whereupon the forward yoke 34 may be moved longitudinally from the outer end 68 of bracket member 64.

From the foregoing, it will be seen that the present invention provides an orderly and effective manner of securing the normally flexible forward end portion of driven shaft means of an agricultural implement to a retaining bracket on a suitable part of the implement so as to prevent injury to said driven means and especially the outermost universal joint thereof. The retaining bracket means afforded by this invention is simple and inexpensive to produce, may readily be secured to either new or existing implements, and is simple to operate for effectively and detachably holding the flexible forward portion of the driven shaft means safely secured to the implement.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. A portable agricultural implement having draft means connectable to a prime mover to pull said implement in trailing manner, and driven shaft means carried by said implement and including a flexible portion at one end connectable to a power take-off member of power means such as a tractor, in combination with bracket means carried by said implement and including means having a portion complementarily interfitting with said flexible end portion, one of said portions having a socket and the other a projection slidably received within said socket to hold said flexible end portion safely and detachably secured to said implement when said portion is not connected to said power take-off member.

2. A portable agricultural implement having draft means projecting from one end thereof connectable to a prime mover for pulling said implement, and driven shaft means carried by said implement and including a flexible forward end portion adjacent the forward end of said draft means, said forward end portion including a socket connectable to a power take-off member of power means such as a tractor, in combination with a bracket member supported by said draft means and having a projection to be received within the socket of said forward end portion of said driven shaft means to secure the same detachably and safely to said draft means when said portion is not connected to said power take-off member.

3. The portable agricultural implement set forth in claim 1 further characterized by said forward end of said flexible driven shaft means terminating in a universal joint and said joint including a yoke connectable to said power take-off member by latch means carried by said yoke, said yoke also being connectable to said bracket member to secure the same detachably and safely to said draft means and said bracket member also having means engageable by said latch means of said yoke when said yoke is connected to said bracket means.

4. The portable agricultural implement set forth in claim 2 further characterized by said socket of said yoke being splined longitudinally internally and said bracket member projection being complementary to opposed spaces between pairs of splines of said socket and received thereby when holding said yoke secured to said draft means.

5. A portable agricultural implement having draft means connectable to a prime mover, a driven shaft supported upon said implement, an auxiliary driven shaft flexibly connected at one end to said driven shaft, and a universal joint assembly connected to the other end of said auxiliary shaft, said universal joint including an outer yoke having a socket connectable to the power take-off shaft of a prime mover, in combination with a bracket carried by said implement and having a projection onto which said yoke socket is detachably connectable to hold said auxiliary drive shaft and universal joint detachably secured to said implement when the latter is drawn by a prime mover while said auxiliary driven shaft is not interconnected to a power take-off shaft.

6. The portable agricultural implement set forth in claim 5 further including a latching member movable transversely to said socket of said yoke and operable to secure said yoke detachably to said power take-off shaft, said bracket projection also having means engageable by said latching member when said yoke socket is disposed thereon, thereby to secure said yoke detachably to said bracket.

References Cited in the file of this patent

UNITED STATES PATENTS

| | | |
|---|---|---|
| 1,207,663 | Thomason | Dec. 5, 1916 |
| 1,999,841 | MacGregor | Apr. 30, 1935 |